(12) United States Patent
McDonnell (10) Patent No.: US 10,919,627 B2
(45) Date of Patent: Feb. 16, 2021

(54) ASYMMETRIC AIRCRAFT AND THEIR LAUNCH AND RECOVERY SYSTEMS FROM SMALL SHIPS

(71) Applicant: Advanced Product Development, LLC, St. Louis, MO (US)

(72) Inventor: William Randall McDonnell, St. Louis, MO (US)

(73) Assignee: ADVANCED PRODUCT DEVELOPMENT, LLC, Las Vegas, NV (US)

( * ) Notice: Subject to any disclaimer, the term of this patent is extended or adjusted under 35 U.S.C. 154(b) by 137 days.

(21) Appl. No.: 15/111,133

(22) PCT Filed: Jan. 13, 2015

(86) PCT No.: PCT/US2015/011149
§ 371 (c)(1),
(2) Date: Jul. 12, 2016

(87) PCT Pub. No.: WO2015/160394
PCT Pub. Date: Oct. 22, 2015

(65) Prior Publication Data
US 2016/0375981 A1    Dec. 29, 2016

Related U.S. Application Data

(60) Provisional application No. 61/927,223, filed on Jan. 14, 2014.

(51) Int. Cl.
*B64C 39/02* (2006.01)
*B64C 39/00* (2006.01)
(Continued)

(52) U.S. Cl.
CPC .......... *B64C 39/029* (2020.01); *B63H 9/069* (2020.02); *B64C 3/10* (2013.01); *B64C 39/024* (2013.01);
(Continued)

(58) Field of Classification Search
CPC ... B64C 3/10; B64C 39/024; B64C 2201/028; B64C 2201/182; B64C 2201/208;
(Continued)

(56) References Cited

U.S. PATENT DOCUMENTS 1,847,549 A * 3/1932 Adams .................. B64F 1/222
414/242
3,756,419 A    9/1973 Dean
(Continued)

FOREIGN PATENT DOCUMENTS

WO    2007086055 A1    8/2007
WO    WO-2009029796 A2 *    3/2009 ............. B64C 30/00

OTHER PUBLICATIONS

International Search Report for PCT application PCT/US2015/011149 dated Oct. 19, 2015.
Written Opinion of the International Search Authority for PCT application PCT/US2015/011149 dated Oct. 19, 2015.
Aerojack Company, Article: Welcome to Aerojack; Aerojack "GoJak 4100" the Angled Ratchet Lever; web address: http://www.aerojack.co.uk/; dated May 29, 2018, p. 1 of 3.

*Primary Examiner* — Valentina Xavier
(74) *Attorney, Agent, or Firm* — Sandberg Phoenix and von Gontard (57) ABSTRACT

An asymmetric aircraft (1) and an aircraft (1) that can operate from small ships (8) and be stored in high density with three aircraft or more in one helicopter hangar (107) without needing a landing gear or wing fold. These aircraft slide into and out of the hangar on dollies (90) like circuit boards in a computer and are launched and recovered using a large towed parafoil (6).

23 Claims, 8 Drawing Sheets

(51) Int. Cl.
*B64F 1/02* (2006.01)
*B64F 1/22* (2006.01)
*B64F 1/04* (2006.01)
*B63H 9/069* (2020.01)
*B64C 3/10* (2006.01)

(52) U.S. Cl.
CPC ............... *B64F 1/02* (2013.01); *B64F 1/029* (2020.01); *B64F 1/0295* (2020.01); *B64F 1/0297* (2020.01); *B64F 1/0299* (2020.01); *B64F 1/04* (2013.01); *B64F 1/222* (2013.01); *B64C 2201/028* (2013.01); *B64C 2201/082* (2013.01); *B64C 2201/182* (2013.01); *B64C 2201/205* (2013.01); *B64C 2201/208* (2013.01); *Y02T 50/10* (2013.01); *Y02T 50/80* (2013.01)

(58) Field of Classification Search
CPC ........ B64C 2201/205; B64C 2201/082; B63H 9/0685; B64F 1/02; B64F 1/222; B64F 1/04; Y02T 50/12; Y02T 50/826
See application file for complete search history.

(56) References Cited

U.S. PATENT DOCUMENTS

| | | | |
|---|---|---|---|
| 4,236,686 A | 12/1980 | Barthelme et al. | |
| 5,054,717 A | 10/1991 | Taylor | |
| 6,874,729 B1 | 4/2005 | McDonnell | |
| 8,408,490 B2 | 4/2013 | McDonnell | |
| 9,359,075 B1* | 6/2016 | von Flotow | B64D 5/00 |
| 9,434,481 B2* | 9/2016 | McGeer | B64F 1/02 |
| 2006/0175463 A1* | 8/2006 | McGeer | B64C 25/68 |
| | | | 244/1 R |
| 2011/0139928 A1* | 6/2011 | Morris | B64C 27/02 |
| | | | 244/1 TD |
| 2013/0052014 A1* | 2/2013 | Kelly | F03D 5/00 |
| | | | 416/66 |
| 2015/0129716 A1* | 5/2015 | Yoffe | B64F 1/02 |
| | | | 244/110 C |
| 2016/0107750 A1* | 4/2016 | Yates | B64C 39/024 |
| | | | 244/2 |

* cited by examiner

ASYMMETRIC AIRCRAFT AND THEIR LAUNCH AND RECOVERY SYSTEMS FROM SMALL SHIPS

CROSS-REFERENCE TO RELATED APPLICATIONS

This patent application is a national stage application under 35 U.S.C. 371 of International application No. PCT/US2015/011149, filed 13 Jan. 2015, which is related to, and claims priority from, U.S. Provisional Application Ser. No. 61/927,223, filed 14 Jan. 2014, the disclosure of which is hereby incorporated by reference.

FIELD OF THE INVENTION

The present invention relates to flying objects that are asymmetric and/or to aircraft capable of operating without runways.

BACKGROUND OF THE INVENTION

U.S. Pat. No. 8,408,490, by the present inventor, discloses an aircraft configuration called the Oblique Blended Wing Body that combines the many advantages of a blended wing body aircraft with the many advantages of an oblique all-wing aircraft. The present invention relates to improvements in the design disclosed in that patent. U.S. Pat. No. 8,408,490 is hereby incorporated herein by reference.

U.S. pat. No. 6,874,729 by the present inventor and Charles Baker discloses a means for operating aircraft without runways and is hereby incorporated herein by reference. The present invention also offers improvements to this earlier patent primarily in the area of large aircraft.

The preferred embodiment of this patent is asymmetric. This asymmetry can result in large yawing moments and the potential for a pitch-up problem if an aft wing stalls first.

SUMMARY OF THE INVENTION

The present invention counters these yawing moments and reduces the potential of an aft wing stalling before a forward wing does. The invention also provides other improvements for asymmetric blended wing body aircraft. The present invention also preferably uses an Oblique Blended Wing Body aircraft and discloses the most beneficial way to launch and recover such vehicles without long runways or aircraft carrier type catapult and arrestment gear and preferably without aircraft landing gear and wingfolds. The present invention also discloses an improved maintenance approach and very compact way of storing multiple aircraft in a small hangar such as on a small air capable ship.

DETAILED DESCRIPTION OF THE PREFERRED EMBODIMENTS

Figure 1:
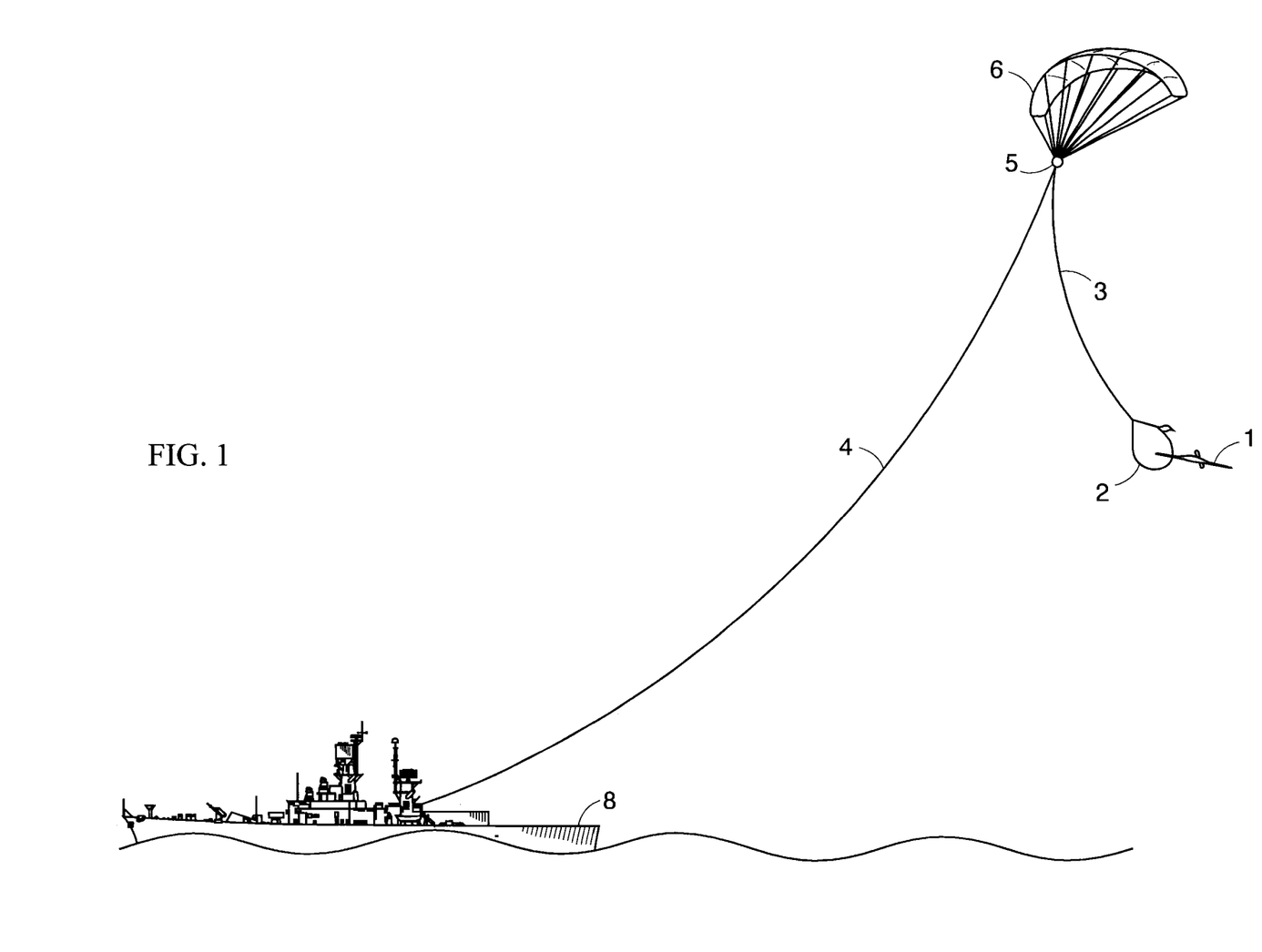
FIG. 1 is a side view of an embodiment of the invention where an aircraft is recovered by engaging and swinging back and forth, or traveling in a circle on a line suspended below a towed parafoil.

FIG. 1 shows an aircraft 1 flying toward the viewer and engaging an arrestment line loop 2 suspended below parasail 6. The aircraft 1 then swings on the recovery line 3 while the energy of arrestment is dissipated by aerodynamic drag and possibly thrust reversing, etc. The parafoil tow line 4 is then pulled in by a winch on the ship 8 to bring the aircraft 1 down to a flight deck 109. Another option is to have the boat pulling the parafoil be separate from the ship that hangars the aircraft. The parafoil boat steers the parafoil over and deposits the aircraft on the flight deck of the air capable ship. Two air capable ships could work together to lower and raise aircraft off of each other. This allows rapid raising and lowering of the aircraft without having to reel in and out the parafoils. Alternatively one ship with the parafoil can launch and recover aircraft for multiple air capable ships.

Having a separate parafoil boat makes it easier to control the fore and aft position of the aircraft as it is deposited on the flight deck of the air capable ship. It also makes it easier to launch and recover the parafoil without having to modify the air capable ship. The parafoil boat can also be used for many other purposes when not launching and recovering the aircraft. The parafoil can carry decoy electronics to protect the air capable ship, it can also carry sensors to provide situational awareness in the vicinity of the ship. The parafoil boat can put itself between potential threats and the expensive air capable ship and steer the parafoil into the path of visually guided missiles for example to disrupt their operations. Sensors can be hooked onto the end of the arrestment line loop and steered over and lowered using the parafoil to look in the windows of suspicious boats or ships. A rappelling line can also be hooked onto the arrestment line loop so that special forces could more quietly rappel onto a ship at night than by using a helicopter. A low frequency antenna wire could also pass up through the parafoil tow line so that varying the length of the tow line will change the length and thus frequency of the antenna. The parafoil boat can also pass a tow line, using the parafoil and arrestment line loop, to any ship wanting the additional propulsion provided by the parafoil to reduce its fuel consumption. Current commercial parafoils can provide up to 8000 pounds of forward propulsion.

The parafoil boat can also be used to transfer cargo between ships. It is most effective when the parafoil boat is between the two ships wanting to exchange cargo.

Ram air turbine on parafoil could provide electrical power for launch/recovery parafoil boat, local area sensors and decoy electronics. If boat is stationary such as in port, and there is no wind, the ram air turbine could be back powered to keep the parafoil flying with its sensors and decoy electronics.

Figure 8:
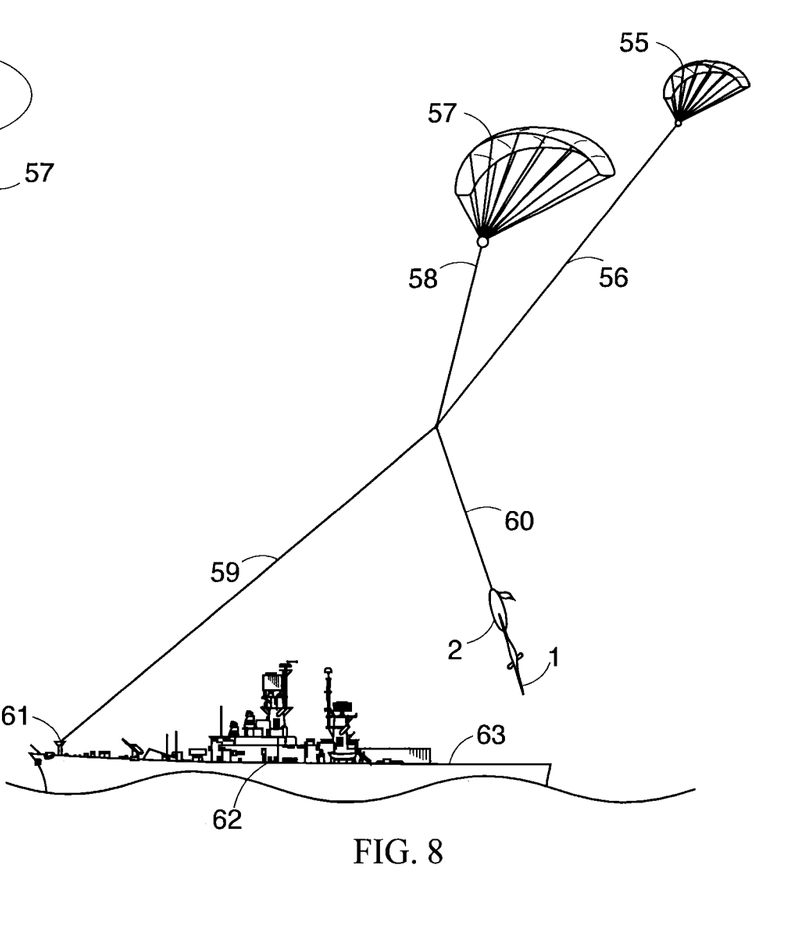
FIG. 8 shows in side view an approach for using two parafoils to lift the aircraft for takeoff and lower it during recovery.

If the parafoil is put on the same boat that houses the aircraft then a winch 5 directly under the parafoil might be valuable to change the length of the recovery line 3 to control where the aircraft will come down on the flight deck independent of having to use the aircraft propulsion to move it around. The winch 61 to reel in and out the parafoils as shown in FIG. 8 is best placed on the front of the ship for forward propulsion and to keep the tow line away from the flight deck when not being used. This arrangement also makes it easier to launch and recover the parafoils without the turbulent air behind the ship's superstructure. Preferably the parafoil can be equipped with a modified control unit that can pull down the back of the parafoil to create increased drag so that the parafoil can be adjusted in position fore and aft and fly far enough back so the aircraft can be deposited on the flight deck. Another approach using two parafoils will be discussed later.

Figure 2:
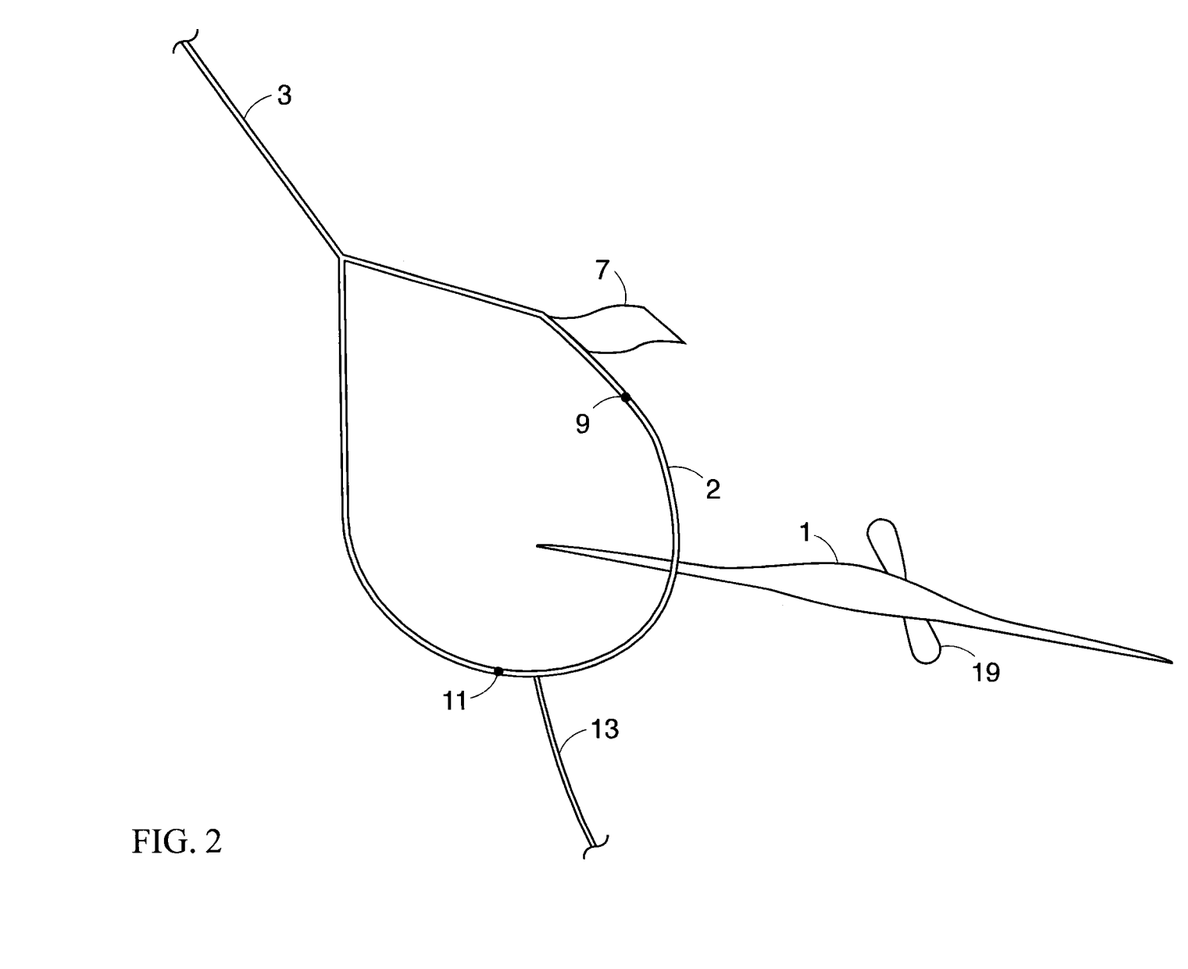
FIG. 2 is a close up view of FIG. 1 showing the aircraft flying toward the viewer and engaging the arrestment line loop.

FIG. 2 shows a close up of one of the preferred embodiments of the aircraft 1 flying toward the viewer and engaging the arrestment line loop 2. A flag 7 provides a visual backup means for the aircraft 1 to see and steer itself into arrestment. Alternatively a heating element on the line could allow the aircraft to be steered in using its IR sensors. The primary means is using differential GPS sensors located above the aircraft at point 9 and below at point 11. A differential GPS sensor in the aircraft thus knows the position of the aircraft relative to the loop 2. If the aircraft wingtip is flown approximately half-way between sensors 9 and 11 there will be a good recovery. The drag of the flag 7 also keeps the arrestment line loop 2 open for aircraft recovery. One of the preferred embodiments is to have the pull-down line 13 attached to the arrestment line loop 2. The top of the pull down line 13 would likely be a lightweight pole so as not to get the line tangled in external stores or other items on the aircraft during recovery. This pole could be used by a sailor to reach up and attach the pull down line 13 to the arrestment line loop 2 in a variation where the pull down line 13 is attached to a ship based winch prior to arrestment. There would be enough slack in the pull down line 13 prior to arrestment so as to allow a low arrestment force recovery. The parafoil could be flown away from being over the flight deck so the pull down line 13 is pulled away from the aircraft to further assist in preventing the pole and line 13 from negatively impacting the aircraft 1. An alternative to pull down lines such as 13 is to use the propeller with its cyclic control to control the movement of the aircraft and the parafoil control the height, with adjustable lift control lines that attach to the back of the parafoil canopy, while a sailor reaches up with a pole to attach the short pull down lines from the dolly which will be discussed shortly.

Figure 3:
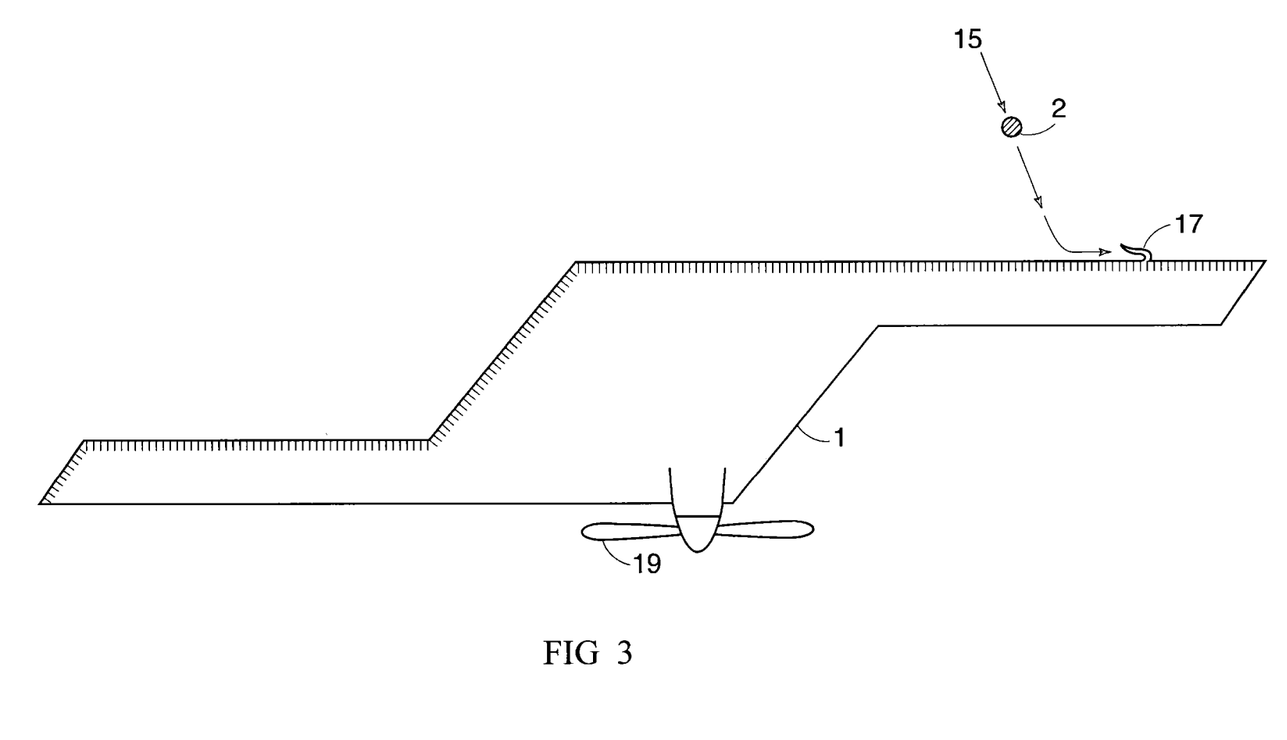
FIG. 3 is a plan view of an illustrative preferred embodiment of the aircraft showing how it would fly in a side-slip and engage the arrestment line.

FIG. 3 shows a plan view of the aircraft 1. The aircraft preferably has three or more blades, illustratively a four bladed pusher propeller 19 where two opposing blades are staggered in front of the others and for storage can rotate to more closely align with the other blades. The propeller 19 preferably has cyclic control similar to a helicopter rotor. The cyclic control can be achieved with a swash plate like a helicopter rotor or with individual propeller blade actuators that vary the pitch of the blades independently as the blades rotate around. Preferably, a simple swash plate, that provides only cyclic control, is used in combination with one or more actuators to provide collective control for all the blades. The collective actuators can be relatively slow acting since the cyclic control provides the rapid one per revolution variation in pitch to the blades. Alternatively small flaps on each blade can be actuated independently, with or without a swash plate, to achieve cyclic control. This cyclic control allows the propeller to augment the vehicle's pitch and yaw control systems which is especially important for launch at low airspeeds. The majority of the time the aircraft flies perpendicular to the plane of the propeller 19. The propeller is biased laterally, relative to the vehicle center of gravity, closer to the forward wing side of the aircraft. This is because the aft wing flies in the upwash of the forward wing so the aircraft wants to yaw toward the forward wing. Alternatively, or in addition, a winglet with more or all of its area extending above the wing could be added to the end of preferably a shorter aft wing which would create an inward force that would tend to counter this yawing moment. Alternatively, or in addition, a small motor such as an electric motor and a small propeller far out near the tip of the forward wing compensates for the yaw effect of the higher drag of the forward wing. Preferably the small propeller would be at the wingtip so that it would benefit from, and counter, the wing tip vortex and thus would turn clockwise looking forward if the forward wing is the right wing. If this small propeller is a pusher configuration the aircraft could still be caught with the forward wing without interfering with the arrestment line loop 2 sliding to the hook or getting caught in the small propeller but preferably the aft wing would be used for recoveries to avoid this potential conflict. Another alternative is to have the aft wing longer in length and have heavy components such as batteries placed at the tip of the aft wing to help get the center of drag closer to the center of thrust from the main engine and propeller 19. Another alternative is to put a streamlined teardrop pod on the aft wingtip similar to wingtip fuel tanks on aircraft like some Lear Jets. The nose of the pod could have a very streamlined roll-theta sensor turret or an azimuth/elevation turret design like on the Boeing/Insitu ScanEagle. This provides a very streamlined design for the sensors with less view blockage from the rest of the aircraft. It also helps to spanload the aircraft to reduce wing bending moments and also gets the sensors away from the rocket blast if Hellfire or other missiles are fired off pylons near the vehicle centerline. This pod approach could move the center of gravity and thus center of drag far enough toward the aft wing that the electric motor and small propeller, if any, to balance out any yaw imbalance might be integrated into the back of the pod instead of on the other side of the aircraft at the end of the forward wing.

In FIG. 3, the path 15 of the arrestment line loop 2 as it travels to engagement with a hook 17 on the leading edge of the forward wing of the aircraft is shown. The path angles to the right because during arrestment the aircraft is flown in a left sideslip primarily to help drive the arrestment line 2 outboard to the hook 17. However the arrestment line loop 2 is also moving to the right anyway because of the relative movement of the parafoil 6. The geometry of the arrestment line loop 2 also causes the line to pull toward the wingtip after engagement because the line is blown in one direction by the relative wind but as the lines goes taut, it pulls back away from this direction. Placing the hook 17 farther outboard than shown in FIG. 3 would provide a larger capture envelope and keep the arrestment line 2 farther away from centerline stores or other aircraft structure that it could get hung up on. It also requires a stronger wingtip to carry the arrestment load, however the loads are really low since the arrestment distance is very large. The aircraft 1 preferably has no landing gear and no wing folds.

Figure 4:
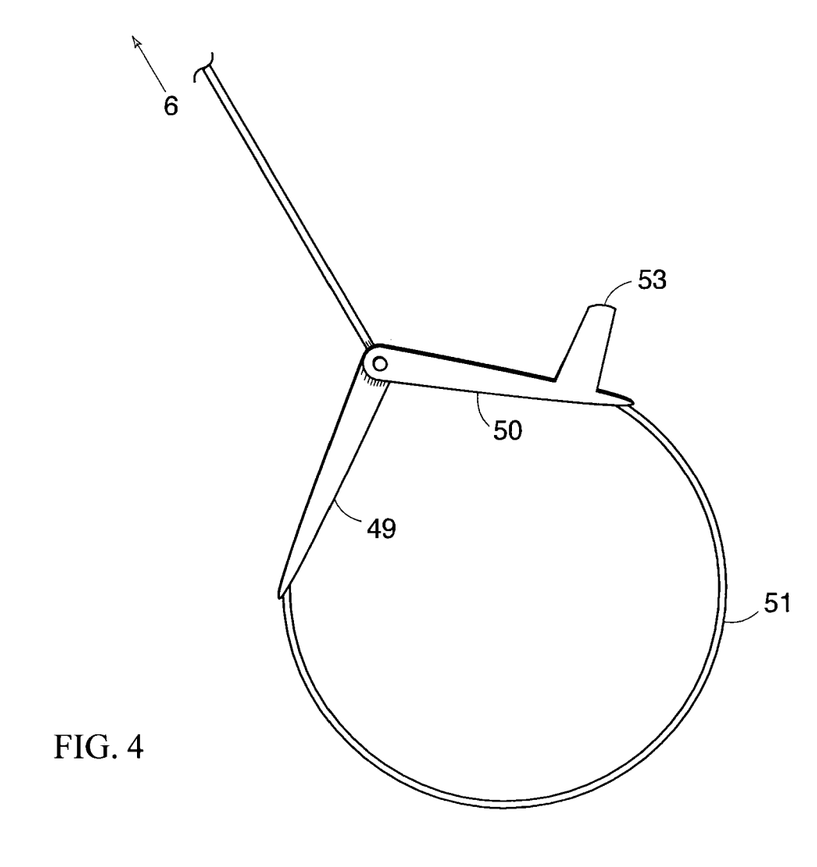
FIG. 4 shows an alternative arrestment line loop design.

FIG. 4 shows an optional arrestment line loop arrangement where lightweight spreader arms 49 and 50 are spring loaded open to hold open the arrestment line loop 51 which is also used for launch. A fin 53 keeps the arrestment line loop 51 oriented properly for aircraft engagement. A third option is to eliminate the spring and forward arm 49 and add at least two more fins like fin 53 so that arm 50 is like a dart with the lift from the fins keeping the loop 51 open.

Figure 5:
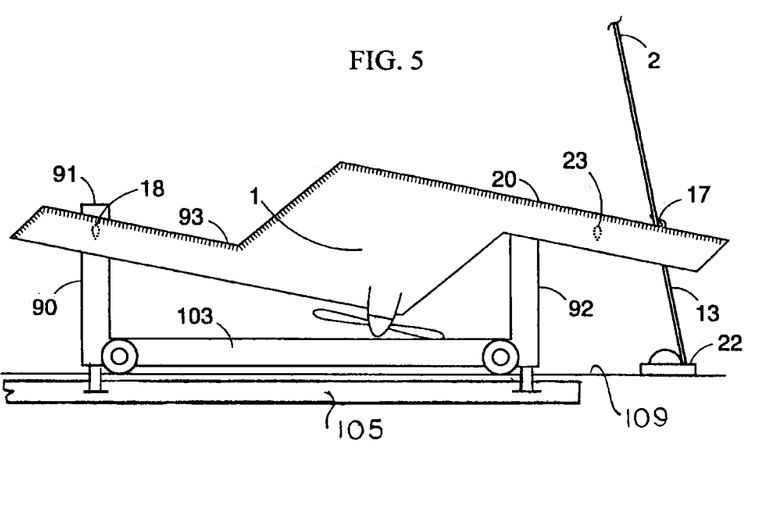
FIG. 5 shows a view from the right side of a flight deck or hangar of a preferred aircraft on a maintenance and transportation dolly that allows three or more aircraft in one helicopter hangar on a ship.
Figure 6:
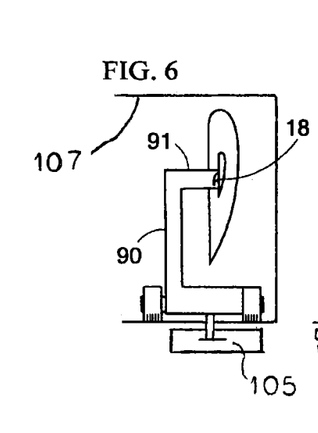
FIG. 6 corresponds to FIG. 5, looking forward relative to the ship.

FIG. 5 shows the aircraft 1 on a maintenance and transportation dolly 90 which is secured to the flight deck 109 by a track 105. Preferably, a track system similar to a RAST system (U.S. Pat. No. 5,687,930, Wagner, et al., incorporated herein by reference) is utilized so it can safely roll in and out of the aircraft hangar 107 in any sea state without turning over no matter how narrow the dolly 90. If the aircraft 1 has significant dihedral in its wings the track 105 can be curved a similar amount as it extends into the hangar 107 so that the aircraft can be nested closer together in the hangar. However it is important to have enough room between the aircraft so that maintenance personnel can move between them. The dolly 90 will be designed to transport the aircraft more parallel to a line extending between the aircraft's wingtips than perpendicular. Generally the closer to parallel the better. Zero degrees misalignment is better than five degrees, which is better than ten degrees, which in turn is better than fifteen degrees, which is better than twenty degrees. The dolly will also preferably be powered by an electric motor to move the aircraft and dolly in and out of the hangar 107 with a manual crank for backup. Preferably the tracks will run between the dollies with one side of the track securing one dolly and the other side securing the other dolly. Optionally maintenance personnel could strap themselves into a tiny man-lift that is also secured to this track inside the hangar so that they can rapidly get to every spot on the aircraft, and be stabilized, no matter how much the ship is pitching, rolling and heaving.

Figure 7:
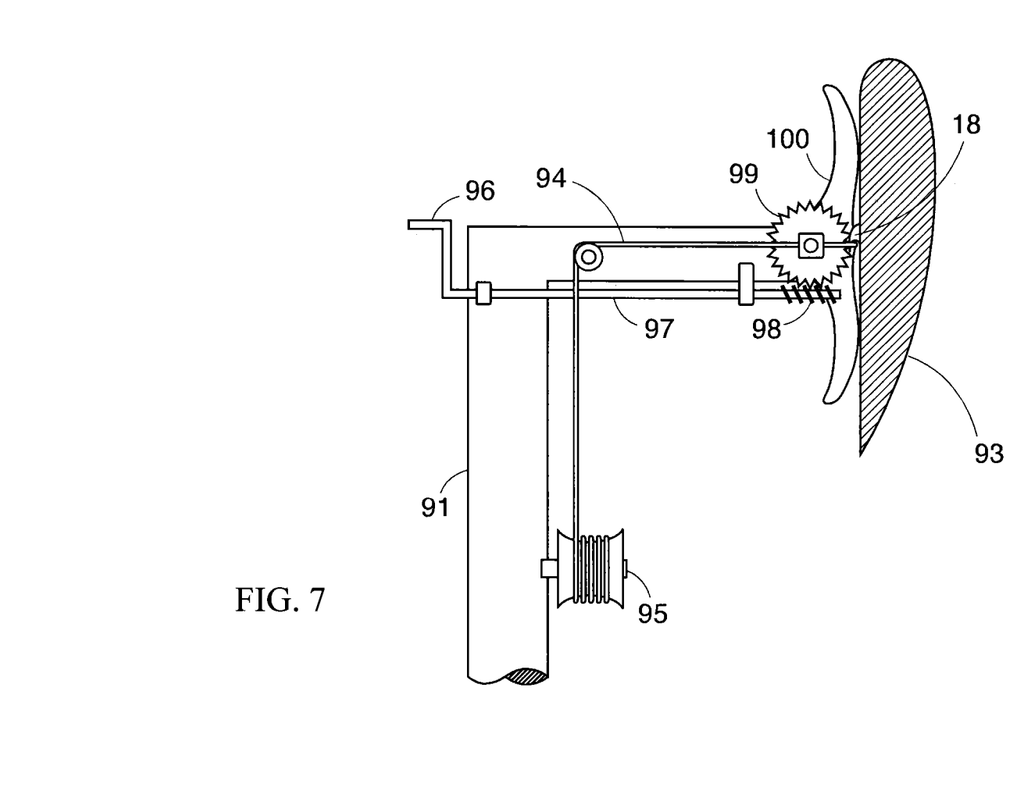
FIG. 7 shows a forward maintenance dolly support strut of FIG. 6 looking forward relative to the ship.

A pull-down line 13 can be attached to the arrestment line loop 2 as shown in FIG. 2. With this approach a flight deck mounted winch 22 as shown in FIG. 5 is used to pull the aircraft down with line 13 to a point where the aircraft is hanging near the dolly 90. A sailor then uses a long pole to attach a loop at the end of a short dolly pull-down line 94, as shown in FIG. 7 to a hook 18 on the underside of the aft/left wing. The winch 95 as seen in FIG. 7 then pulls line 94 to pull the left wing 93 of aircraft 1 over into engagement with the transportation and maintenance dolly 90. The right side of the aircraft is then lowered by reeling in the pull-down line 13 with winch 22 until a sailor can attach another short pull down line from mast 92 of the transportation and maintenance dolly to hook 20 on the underside of the right wing. A similar winch to 95 but on mast 92 pulls the right wing of the aircraft into engagement with the support and maintenance dolly 90. The dolly 90 can be very narrow and still roll in and out of the hangar in any weather since it is secured to the flight deck and floor of the hangar by one or more tracks. Since the aircraft are stored and maintained in a vertical, or near vertical, orientation this allows three or more aircraft to fit in a helicopter hangar only wide enough for one helicopter. Holding the aircraft where the external surfaces are closest to vertical relative to the hangar generally maximizes the potential to get as many aircraft in the hangar as possible and makes it easier to maintain the aircraft. This allows great access to maintain the aircraft with the personnel standing or sitting. Having the average of all aircraft surfaces being perfectly vertical is preferred to being off by five degrees which is better than being off by ten degrees which is better than being off by fifteen degrees, which is better than being off by twenty degrees which in turn is better than thirty degrees. The asymmetric blended wing body aircraft 1 as shown naturally has a very short length in the direction of flight so that when it is stored this way it doesn't exceed the height of the hangar. Other aircraft such as with canards or horizontal tails on booms that fold could achieve short lengths in the direction of flight for storage but this requires more complexity.

The dolly 90 has a U-shaped frame when viewed from above so it is open in back to allow support equipment and materials to be rolled in under the aircraft unobstructed by landing gear, etc. The mechanism shown in FIG. 7 allows the aircraft to be rotated to a level position for loading of stores such as bombs or missiles. Masts 91 and 92 may be adjustable in height to put the aircraft in the most advantageous position.

A stand or ladder for maintenance personnel to reach access doors high on the aircraft can be designed to lock into the fore and aft structural member 103 of the dolly 90. Member 103 runs along just one side of the dolly 90 to allow materials to be rolled in under the aircraft.

For aircraft with wingspans longer than the length of the helicopter hangar a wing fold 23, as shown in FIG. 5, is required. The wing fold 23 however is as far outboard as possible to minimize the weight penalty and improve maintenance access. The wing fold (not shown) could also be put in the aft wing 93 and could be retracted before the aircraft is lowered to the flight deck during a recovery to make the aircraft more stable in the turbulent air behind the ship's superstructure. As shown in FIG. 5, the aircraft has a shorter length in the direction of flight than its wingspan when in its stored configuration, whether or not provided with wing fold(s) 23.

FIG. 7 shows the aft maintenance dolly support mast 91 looking forward relative to the ship. Hook 18 is on the underside of the aircraft left wing 93. Pull down line 94 has a loop at the end that has engaged latching hook 18 and is holding the aircraft against the support mast bumper 100. The pull down line 94 goes over a pulley as shown down to winch 95. To rotate the aircraft away from the vertical, crank arm 96 can be rotated which rotates rod 97 which in turn rotates worm gear 98 which turns gear 99 which rotates padded bumper 100 and aircraft through forward wing 93. Although not shown the aircraft can be raised or lowered by raising or lowering the top portion of the support mast 91 and 92. It will be understood that the support mast alternatively may be located on the opposite side of the aircraft. In this alternative case the bumper 100 would be contoured to the top instead of the bottom of the wing 93. This is actually probably the preferred approach.

When the aircraft 1 is secured at the forward 92 and aft 91 support masts, hook 17 releases the arrestment line loop 2.

Launching the aircraft 1 is essentially the reverse of the landing process except the aircraft is released at altitude where it can pick up speed in a dive and pull up into level flight. This launch approach has been demonstrated for the U.S. Coast Guard. For takeoff the aircraft 1 disengages from the support masts 91 and 92 in essentially the reverse of the engagement starting with re-attaching the arrestment line loop 2 to hook 17 which will lift the aircraft for takeoff. The deck mounted winch 22 however is not needed. The pull-down line 13 is tied up so as not to get tangled in the propeller when the engine starts. Aircraft hooks 18 and 20 preferably can release their respective pulldown lines by remote control. As the aircraft is lifted up, pull down lines from masts 91 and 92 reel out and hooks 17 and 18 release these pull down lines from the aircraft when the aircraft is far enough above the dolly to prevent contact.

An alternative to lifting the aircraft with releasing hook 17 is to have a releasing hook on the top of the center-body over the vehicle center of gravity (see where lead line 1 is pointing in FIG. 5).

FIG. 8 shows a way for two parafoils 55 and 57 to generate more lift and still keep the tow line relatively stable for lifting or lowering the aircraft. A parafoil can generate much more lift if it flies faster. The lift is proportional to the square of the airspeed. As a result if it is flying across the wind direction it has to fly farther and thus much faster and thus generates much more lift. At some point of course it has to stop and fly the other direction. If the parafoil flies in a figure-8 pattern laid on its side (see FIG. 9), then it lags a little more behind the ship as it moves from one side to the other then accelerates forward as it turns which helps to compensate for the reduced side velocity. As a result the parafoil can continue to generate more lift everywhere than if it always flew in line with the ship. However with just one parafoil, the side to side motion may make it more difficult to lower the aircraft to the flight deck. Because the aircraft is lighter on landing this figure-8 motion may not be required for landing and might only be used for lifting the aircraft for takeoff. For takeoff, the single parafoil approach could oscillate from left to right at the correct frequency so the aircraft swings just opposite of the parafoil motion. At some point on the suspension line 3 between the parafoil and aircraft the line is near stationary as the aircraft swings in one direction and the parafoil flies in the opposite direction. The aircraft would preferably be raised clear of the flight deck while still connected by the pull down lines like 94 of the dolly 90 so it wouldn't start swinging until after being released above the flight deck. At some height the parafoil's back and forth oscillation frequency can change to the pendulum's natural frequency so that the aircraft is rapidly swung back and forth up to, or close to, the height of the parafoil before release. The thrust from the aircraft's propeller 19 can assist in swinging the aircraft up to high altitude and a near level attitude. It is also possible for the aircraft to fly in an expanding circle, hanging from line 3 or 60, or do a slingshot type launch using the steerable parafoil to build up speed for a lower altitude launch. Commercial parafoils can fly up to 150 knots. The cyclic on the propeller 19 provides the aircraft with more pitch and yaw control especially at low speeds.

Figure 9:
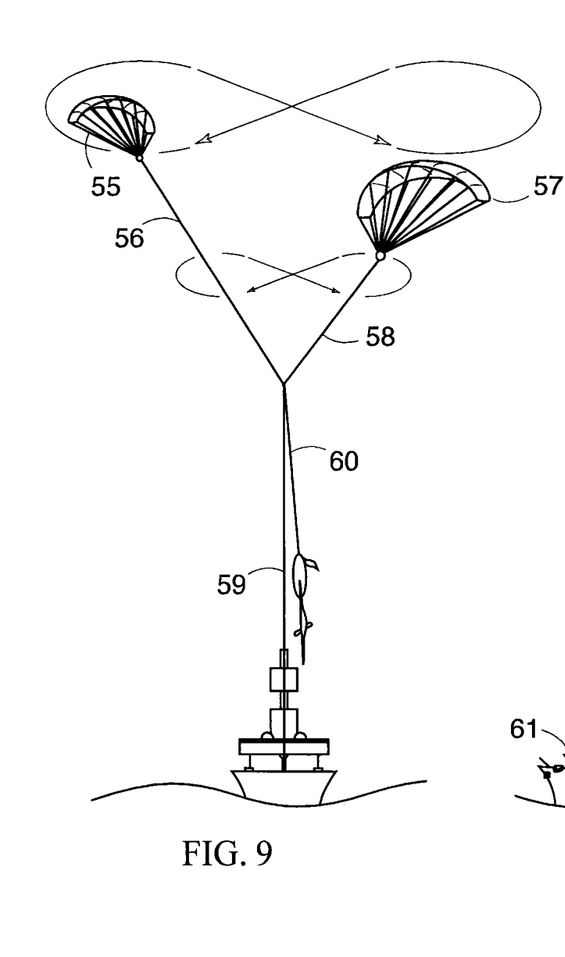
FIG. 9 shows a view of FIG. 8 looking at the front of the ship.

However it may be advantageous both for takeoff and landing to have two parafoils 55 and 57, as shown in FIGS. 8 and 9, preferably with different length lines 56 and 58 so it is easier for the two parafoils 55 and 57 to pass each other in the middle, as they oscillate back and forth, and so they are influencing different air.

Parafoil 55 travels farther and moves faster in its figure-8 pattern so it could be smaller than parafoil 57 and still generate near the same lift to balance out the system. For the purposes of spares and interchangeability it would be better to have the parafoils the same size. Because parafoil 55 is steered more to the left and right than parafoil 57 it ends up flying behind parafoil 55 so they do not interfere with each other and their left and right movements cancel out the left and right oscillations that you would have with a single parafoil. Parafoil 55 can of course be steered more aft in the middle and parafoil 57 can be steered more forward in the middle to increase the separation between the two as they pass each other which would be especially critical if the two did not have different length tow lines 56 and 58. There is a slight fore and aft oscillation since both parafoils lag a little behind the ship as they translate across from one side to the other and then catch up during the turn, however this tends to be partially cancelled out by the higher lift and drag when flying across the direction of ship travel that will tend to raise tow line 59 below the attachment to recovery line 60 which is supporting the weight of the aircraft 1. This two parafoil approach also allows the ability to change the lifting force so a recovery/launch line 60 can be lowered without a weight on the end of it and then can raise it after picking up an aircraft or other payload. Reducing the lifting force can be done by less aggressive, or no, figure-8 maneuvering of the parafoils. To go to even less lifting force than no figure-8 motions, the parasails can be commanded to fly in different directions so their lift is oriented mostly horizontally and opposing each other than it is vertical. By being able to rapidly adjust the lifting force of the parafoils it makes it faster to raise and lower the aircraft with the arrestment line loop 2 than reeling in or reeling out the winch 61. This also makes it easier to pick up an object such as off another boat without having to bring the parafoil boat/ship as close because the angle of the line 4 above the horizontal can now be adjusted. By being able to reduce the lift and drag produced by the parafoils it is also easier for the winch to rapidly reel in the line 59.

When parafoils 55 and 57 or just a single parafoil are used for forward propulsion and the relative wind is coming from the forward two quadrants, the parafoil(s) can provide forward propulsion but they can also be providing a considerable side force that wants to turn the ship. This turning moment can be countered by the ship's rudder but this increases drag. To minimize or eliminate this parafoil induced turning moment, repositioning winches 62 on either side of the ship could be provided with lines that extend over to tow line winch 61 and each line from these repositioning winches 62 has a pulley that encircles tow line 59 after it exits the tow line winch 61. If the left or right repositioning winch 62 is retracted it will pull the base of the tow line 59 over to it. Thus the repositioning winch is used to effectively move the base of the tow line back toward the rear end and side of the ship before it goes up to the parafoil to minimize or eliminate this turning moment for the ship. From this position the parafoil(s) also can be steered up or down in altitude to provide a damping force to the ship to help reduce the ship's rolling motion. It will be understood that the tow line winch 61 could be interchangeably positioned with one of the repositioning winches 62 to achieve the same effect and an additional repositioning winch 63 could move the base of the tow line 59 even farther back if desired for controlling the point where the aircraft 1 is deposited on the flight deck. The parafoil can also be used to maneuver the ship unconventionally in tight quarters such as moving the ship to the side to pull up or pull away from a dock. It could also be used to turn the ship clockwise and in place by using the parafoil to pull the bow of the ship to the right and aft while using the ship's propulsion to push the aft end of the ship forward and to the left.

The aircraft can have rapidly interchangeable conformal pods that conform to the underside of the aircraft that allow the aircraft to rapidly change between different missions such as anti-submarine warfare, reconnaissance, air to ground missions, communications relay/resupply missions, electronic countermeasures/cyber-attack, etc.

Landing and takeoff on land is similar to at sea except a helicopter is required instead of a parafoil. The helicopter in translational flight would lower its external cargo line with potentially the cargo hook streamlined and/or carrying a small weight to keep the line more vertical. The aircraft would slowly approach and engage the cargo line with its leading edge hook 17. The helicopter would then rise in altitude, or aircraft descend, and a cushioned stop on the helicopter external cargo line would prevent the aircraft from descending to the end of the cargo line. The bottom part of the cargo line acts as the pull-down line. Aircraft could slowly roll to the left and/or fly to the left to transfer weight from wingborne to cargo cable born flight. Winch(es) on the ground or maintenance dolly might be used to pull the aircraft down for precise control in landing.

Figure 10:
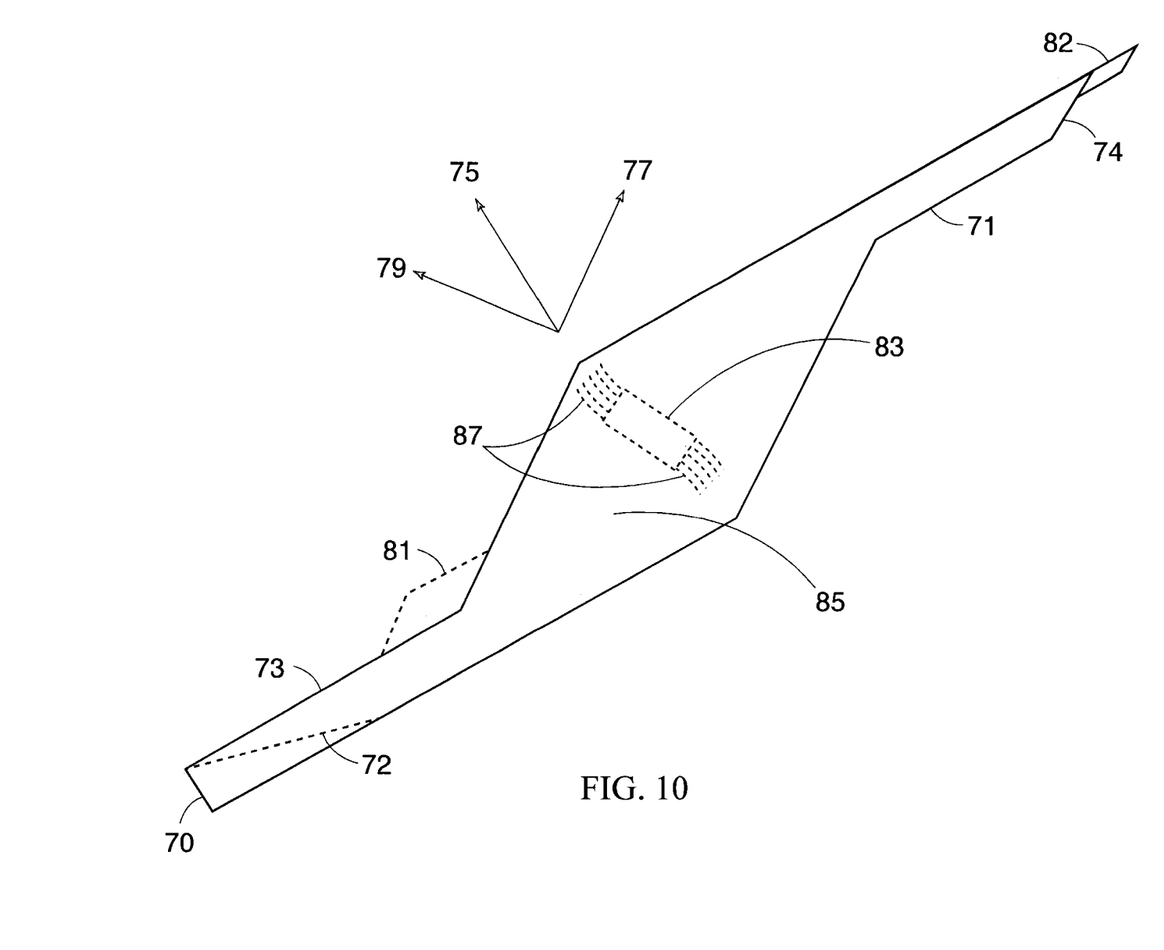
FIG. 10 shows a preferred planform layout of a jet engine powered version of the aircraft.

FIG. 10 shows a plan view of a jet powered embodiment of the current invention. The aircraft is designed to fly generally in direction 75 at low speed and generally but optionally direction 77 at high speed. The aircraft could also fly in direction 79 to make the aircraft more unstable in pitch and more maneuverable. It can differ from the preferred embodiment of my prior patent in at least one of eight general areas or combinations of these general areas.

First, the forward wing 71 can have a smaller chord length than the aft wing 73. Because of this unique configuration where one wing is located ahead of the other, when the aircraft hits an updraft, the aft wing 73 actually sees a greater increase in angle of attack than the forward wing because it both sees the updraft and also gets the increased updraft induced by the forward wing 71 and center-body 85 since it is aft and to the side of these other surfaces. This helps the aft wing 73 provide greater aircraft pitch stability, but it also increases the probability that the aft wing 73 could stall first unless it is at a lower wing loading than the forward swept wing 71. Giving the forward wing 71 a smaller chord or more incidence provides a margin of safety that the forward wing will stall first. Also, reducing the chord of the forward wing 71 relative to the aft wing 73 increases the inherent pitch stability of the aircraft.

The forward wing 71 can also be provided with spoilers or stall strips on the leading edge to force it to stall first or if the aircraft detects that the aft wing has stalled.

The forward wing 71 might also be shorter in span which also increases the inherent pitch stability of the aircraft, reduces the weight of the forward swept wing 71, and reduces the potential for pitch divergence. This however increases the induced drag for the same amount of lift. Making the forward wing 71 longer than the aft wing 73 reverses these factors and decreases the induced drag of the forward swept wing.

Secondly, from a radar signature standpoint it is possibly a little more desirable to have little or no wing dihedral. An embodiment of the current invention provides the equivalent of aerodynamic twist with a variable trailing edge flap on the forward wing 71 or aft wing 73 or both.

Thirdly, the asymmetric nature of this aircraft also makes the aircraft want to yaw toward the forward wing. The best way to counter this natural tendency to yaw toward the forward wing 71 is to orient the front of the engine 83 more toward the side of the aircraft with the aft wing 73 as shown in FIG. 10. The air entering the intake will have to be deflected to line up with the engine by the intake and the exhaust nozzle will preferably re-orient the exhaust to exit nearly straight aft. Turning vanes 87 (in dashed lines) are shown in front of and behind the engine. This also might take the place of s-ducts to hide the engine from radar. As a result the air may have to be deflected less than in an s-duct resulting in better efficiency. This will cause a yawing moment that tends to counter the natural tendency of this aircraft to yaw toward the forward wing 71. Previous methods for countering this yawing moment from my previous patent still apply.

Fourth, by flying in direction 79, the aircraft is more unstable in pitch so the trailing edge flaps all along the trailing edge of the vehicle can be deflected down farther and the thrust from the engines blowing over the trailing edge can be deflected down more by the trailing edge flaps to increase the lift of the vehicle while still maintaining equilibrium in pitch. The vehicle is more unstable in pitch because the aft swept wing 73 now becomes a forward swept wing and now wing 71 increases in lift more than wing 73 with increasing vehicle angle of attack since wing 71 is flying more in the upwash from the rest of the aircraft. Increasing lift from wing 71 wants to increase the angle of attack of the aircraft around the pitch axis as described in my previous patent because wing 71 is in front of the pitch axis. The exact opposite is happening with wing 73 which now sees less increase in upwash from the rest of the vehicle with increasing angle of attack. This also is less stabilizing since wing 73 is behind the pitch axis.

The fifth difference from my earlier embodiment is the incorporation of a wider chord aft swept wing 73 at its root as shown by dashed lines 81 in FIG. 10. This could have value when the aircraft is flying in direction 77 to handle the higher upwash of air from the centerbody 85 and forward wing 71. This wider chord section 81 has sides that remain parallel to other major planview sides of the aircraft for radar stealth reasons.

The sixth difference is the option of having all edges of the aircraft long enough to have a low radar signature in the VHF radar frequency range. To do this you need all planview exterior mold lines to be significantly larger than the VHF wavelength. As a result you want to eliminate the short wingtip mold line 70. Dashed line 72 shows an alternate trailing edge for aft wing 73 that eliminates exterior mold line 70. With this new trailing edge 73, the chord at the wingtip is zero. The same approach can be used on the forward wing 71. The wingtips would preferably be twisted more and more down in pitch as the chord goes to zero so as not to cause the wingtip to stall early.

The seventh difference is that the aircraft could land and/or take off in a swept wing attitude if wingspan were critical such as on an aircraft carrier where there is limited clearance on either side of the runway. The aircraft could take off and/or land with a positive sweep angle such as flying in direction 77 or somewhere between 75 and 77. It could also take off and/or land with a negative sweep angle such as flying in direction 79 or even more highly negatively swept in a direction even further counter-clockwise than 79.

The eighth difference is that the forward swept wing 71 in FIG. 10 could have a wingtip 74 that is angled not like 70 but within fifteen degrees, and preferably ten degrees of parallel to the direction of flight 77 in high speed. At the very forward tip of this wingtip could be located an aileron 82 whose aerodynamic center is in front of the elastic axis of the forward swept wing 71. As a result you would get favorable twisting of the wing 71 when the aileron 82 is deflected to provide wing 71 flutter, gust or maneuver load alleviation. This approach could also be more efficient since the aileron 82 has less volume and lift to create less of a shock wave.

"A fixed wing aircraft" as used herein excludes a helicopter which is sometimes referred to as a rotating-wing aircraft. It is understood that other combinations or variations on the current invention, within the scope of the appended claims, are possible.

The invention claimed is:

1. A fixed wing aircraft for atmospheric flight using aerodynamic lift, the aircraft comprising a primary airfoil structure; and
a dolly engaging the primary airfoil structure of the aircraft and supporting the aircraft in a stored configuration with the airfoil structure more in a vertical than horizontal plane and with a forward direction of flight angled more vertical than horizontal, the aircraft having a shorter length in the direction of flight than span when in the stored configuration, the aircraft having a horizontal width, excluding any propeller, in the stored configuration that is less than half its length in the direction of flight, the dolly being moveable to transport the aircraft.

2. The aircraft and dolly of claim 1 where the dolly supports the aircraft by the primary airfoil structure.

3. The aircraft and dolly of claim 1 where the dolly is mounted on a track, the track extending continuously along a floor of a hangar and along a flight deck of a ship, so that the aircraft can be transported on the dolly along the track from the flight deck to the hangar and from the hangar to the flight deck.

4. The aircraft and dolly of claim 3 where an additional track extends from the flight deck to the hangar, an additional dolly being mounted on the additional track to transport an additional aircraft along the additional track from the flight deck to the hangar and from the hangar to the flight deck, the additional aircraft being stored in the hangar spaced laterally from the first-mentioned aircraft to permit access to both aircraft from the floor of the hangar.

5. The aircraft and dolly of claim 3 where the aircraft has no landing gear.

6. The aircraft and dolly of claim 3 where the aircraft's wings are not capable of folding or rotating relative to the rest of the aircraft.

7. The aircraft and dolly of claim 1 where the dolly is equipped with a winch to pull the aircraft to the dolly.

8. The aircraft and dolly of claim 1 further comprising a towed parafoil to launch and recover the aircraft.

9. The aircraft and dolly of claim 1 where the dolly can rotate the aircraft to a level upright attitude that it would have during flight.

10. The aircraft and dolly of claim 1 where the aircraft has a single main left wing and a single main right wing in which lines that best approximate the predominant leading edges of the left and right main wings in plain view do not overlap each other in the wingspan of the aircraft and one of the lines passes behind the wing root quarter chord of the other main wing.

11. The aircraft and dolly of claim 10 in which one of the lines passes behind the wing root half chord line of the other main wing.

12. The aircraft and dolly of claim 10 where the aircraft has a centerbody wing section with a long axis, the long axis connecting the left and right wings, the left and right sides of the centerbody having a more rapid decrease in chord length than the left or right wing as the centerbody wing section extends outboard to the left and right wing.

13. The aircraft and dolly of claim 11 wherein the straight line projection of one of the leading edges passes behind the wing root three-quarter chord line of the other main wing.

14. The aircraft and dolly of claim 4 wherein the one or more tracks are secured below the floor of the hangar and flight deck.

15. The aircraft and dolly of claim 1 wherein the aircraft is stored next to another similar aircraft with the aircraft nested as viewed from above such that the top or bottom of the aircraft during flight is nested to the top or bottom of the other aircraft with sufficient room for maintenance personnel to pass between the aircraft.

16. The aircraft and dolly of claim 1 where the aircraft has a propeller for primary propulsion.

17. The aircraft and dolly of claim 1 where the dolly supports the primary airfoil structure within fifteen degrees of vertical.

18. The aircraft and dolly of claim 1 where the dolly supports the primary airfoil structure within ten degrees of vertical.

19. The aircraft and dolly of claim 1 where the dolly supports the primary airfoil structure within five degrees of vertical.

20. A water vehicle comprising:
a flight deck,
a hangar having a floor, the flight deck and hangar floor being substantially coplanar,
a track extending from the flight deck to the floor of the hangar, and
a dolly moveably mounted to the flight deck and hangar floor through the track, for travel along the track from the flight deck to the hangar floor and back,
the dolly having structure constructed to engage an aircraft and hold it in the air above the flight deck and hangar floor in a nose up or nose down attitude with wings generally aligned parallel to the track, the structure including spaced-apart upstanding arms and vertical bumpers on the arms, the vertical bumpers being constructed to engage the aircraft.

21. In combination:
a fixed wing aircraft adapted for atmospheric flight using aerodynamic lift, and
a water vehicle comprising:
a flight deck,
a hangar having a floor,
a dolly moveable from the flight deck to the hangar floor and back; and
an aerial lifting apparatus constructed to recover the aircraft from the air and to support the aircraft as the aircraft is moved toward the dolly;
the dolly being constructed to support the fixed wing aircraft, the dolly comprising a plurality of support structures, each support structure comprising an upright and a bumper mounted to the upright, the bumper being constructed and positioned to engage a broad face of the aircraft, the bumper being mounted to the upright for rotation about a bearing from vertical to horizontal orientation.

22. In combination:
a fixed wing aircraft adapted for atmospheric flight using aerodynamic lift,
an attachment point on the aircraft,
a water vehicle comprising:
a flight deck,
a hangar having a floor,
a dolly moveable from the flight deck to the hangar floor and back;
an aerial lifting apparatus constructed to recover the aircraft from the air and to support the aircraft as the aircraft is moved toward the dolly;
the dolly being constructed to support the fixed wing aircraft, the dolly comprising at least one support structure engageable with the aircraft; and a winch comprising a cable attachable to the attachment point on the aircraft, the winch being constructed and positioned to pull the aircraft and the support structure together.

23. In combination, a fixed wing aircraft for atmospheric flight using aerodynamic lift, the aircraft comprising a primary airfoil structure, the aircraft having an attachment point, and the aircraft having no landing gear;

a dolly supporting the aircraft in a stored configuration with the airfoil structure more in a vertical than horizontal plane and with a forward direction of flight angled within fifteen degrees of vertical, the dolly comprising a plurality of support structures, each support structure comprising an upright and a bumper mounted to the upright, the bumper being constructed and positioned to engage a broad face of the primary airfoil structure, the bumper being mounted to the upright for rotation about a bearing from vertical to horizontal orientation; and a winch comprising a cable attachable to the attachment point on the aircraft, the winch being constructed and positioned to pull the broad face of the primary airfoil structure and the bumper together.

* * * * *